(12) United States Patent
Sowatzke et al.

(10) Patent No.: US 6,269,691 B1
(45) Date of Patent: Aug. 7, 2001

(54) AUTOMATIC TIRE INFLATION SYSTEM WITH BOOSTER PUMP

(75) Inventors: Kent Andrew Sowatzke, Lockport, IL (US); Frank Joseph Sonzala, San Antonio; Mark Kevin Hennig, Corpus Christi, both of TX (US)

(73) Assignee: Equalaire Systems, Inc, Corpus Christi, TX (US)

( * ) Notice: Subject to any disclaimer, the term of this patent is extended or adjusted under 35 U.S.C. 154(b) by 0 days.

(21) Appl. No.: 09/527,732

(22) Filed: Mar. 17, 2000

(51) Int. Cl.⁷ ................................................. B60C 23/10
(52) U.S. Cl. ......................... 73/146.2; 141/38; 152/416; 152/417; 340/442
(58) Field of Search .................... 73/146, 146.2, 73/146.3, 146.4, 146.5, 146.8; 152/415, 416, 417, 418, 419; 141/38; 340/425.5, 438, 442

(56) References Cited

U.S. PATENT DOCUMENTS

| | | | |
|---|---|---|---|
| 1,072,907 | * 9/1913 | Brooks . | |
| 1,165,057 | * 12/1915 | Bayly . | |
| 2,685,906 | * 8/1954 | Williams . | 152/417 |
| 4,343,338 | * 8/1982 | Hart | 152/417 |
| 4,387,931 | * 6/1983 | Bland | 152/416 |
| 4,431,043 | * 2/1984 | Goodell et al. | 152/417 |
| 4,441,539 | * 4/1984 | Hulse | 152/417 |
| 4,763,709 | * 8/1988 | Scholer | 152/416 |
| 4,844,138 | * 7/1989 | Kokubu | 152/417 |
| 5,287,906 | 2/1994 | Stech . | |
| 5,452,753 | * 9/1995 | Olney | 152/417 |
| 5,584,949 | 12/1996 | Ingram . | |
| 5,767,398 | 6/1998 | Naedler . | |
| 5,769,979 | 6/1998 | Naedler . | |
| 6,131,631 | * 10/2000 | Bradley et al. | 152/417 |

* cited by examiner

Primary Examiner—Eric S. McCall
(74) Attorney, Agent, or Firm—Fulbright & Jaworski

(57) ABSTRACT

An automatic tire inflation system with a booster pump actuated by the compressed air supply on the truck-trailer to pump the air pressure to a higher output pressure to supply air to tires that may require a higher inflation pressure than the truck-trailer system provides. In addition, a surge protection valve and a pressure relief valve are provided in the system to provide proper operation of the system.

16 Claims, 2 Drawing Sheets

AUTOMATIC TIRE INFLATION SYSTEM WITH BOOSTER PUMP

FIELD OF THE INVENTION

The present invention is directed to an automatic tire inflation system (ATIS) for use in a vehicle such as a truck trailer having an air supply thereon which is provided with a booster pump for increasing the air pressure necessary to comply with the recommended pressure set forth by the tire manufacturer. The system also includes pressure surge protection and pressure relief protection.

BACKGROUND OF THE INVENTION

It is known to provide an ATIS which controls the inflation pressure of tires on a vehicle, such as a truck-trailer as shown in U.S. Pat. Nos. 5,584,949, 5,287,906, 5,767,398, 5,769,979; and U.S. patent application Ser. No. 09/309,140, filed May 10, 1999. The ATIS will utilize the air supply of the vehicle to provide air to the rotating tires when the tires' air pressure falls below the desired pressure. However, it may become necessary to inflate tires to a pressure higher than the output of the vehicle's compressor. For example, in Europe the trailer tire of choice is known as the Super Single. The proper air pressure for a Super Single tire is between 120 psi (8 bars) and 135 psi (9.5 bars). However, there are laws in the U.K. and other European countries that limit the air pressure that can be provided to the trailer to a maximum pressure of 120.7 psi or 8.5 bar. In such situations, there is no ATIS available, and such high pressure tires are required to be inflated from conventional roadside compressors.

SUMMARY OF THE INVENTION

The present invention is directed to an automatic tire inflation system which provides a higher inflation pressure than the truck-trailer system is allowed to deliver. The present invention takes the available air pressure from the vehicle air supply and utilizes a booster pump which increases the air pressure from the air supply to an amount necessary for proper tire inflation. In the preferred embodiment, the improved ATIS includes a booster pump, a pressure relief valve, and a surge protector valve.

The present invention is directed to an air inflation system for a vehicle having at least one axle with at least one wheel having a pneumatic tire at each end of the axle, in which the vehicle includes an air supply. An air connection including a rotary connection is provided between the air supply and the tires. Means are provided for increasing the air pressure from the air supply to the tires and includes an air booster pump having an inlet and an outlet and the inlet is connected to the air supply and the outlet is connected to the rotary connection and the tires in which the pump increases the air pressure from the air supply.

Still a further object of the present invention is wherein the booster pump includes first and second cylinders and each cylinder includes a piston movable therein and the pistons are connected together. In the preferred embodiment the pistons are equally sized.

Still a further object is wherein the first cylinder includes chambers A and B on opposite sides of the piston therein and the second cylinder includes chambers C and D on opposite sides of the piston therein.

Yet a further object is wherein the booster pump includes a spool valve which controls pressuring and exhausting air in the chambers A and D and first and second pilot valves that control the spool valve.

A still further object of the present invention is wherein the booster pump includes first and second check valves connected between the inlet and chambers B and C, respectively, and third and fourth check valves connected between chambers B and C, respectively, and the outlet.

Still a further object is wherein the spool valve is connected to the inlet and to an exhaust.

Yet a still further object of the present invention is a provision of an air inflation system for a vehicle having at least one axle with at least one wheel having a pneumatic tire at each end of the axle in which the vehicle includes an air supply. An air connection is provided between the air supply and the tires including an air passageway inside the axle and a rotary air connection is in communication with a passageway. A pressure control valve controls the pressure in the air connection and a sensor is connected to the air connection for detecting an air leak in a tire. The system includes an air booster pump having an inlet and an outlet with the inlet connected to the air supply and the outlet connected to the air connection to the tires in which the pump increases the air pressure from the air supply. Preferably, the air inflation system includes a surge protection valve connected to the outlet of the booster pump and to the sensor for dampening any surge pressure produced by the pump. Also it is preferable to include a pressure relief valve connected to the outlet of the booster pump for additional protection.

Other and further objects, features and advantages will be apparent from the following description of a presently preferred embodiment of the invention, given for the purpose of disclosure, and taken in conjunction with the accompanying drawings.

DETAILED DESCRIPTION OF THE PREFERRED EMBODIMENT

The automatic tire inflation system having a booster pump of the present invention may be used in various types of automatic tire inflation systems such as: U.S. Pat. Nos. 5,584,949, 5,287,906, 5,767,398, 5,769,979; and U.S. patent application Ser. No. 09/309,140, filed May 10, 1999.

Figure 1:
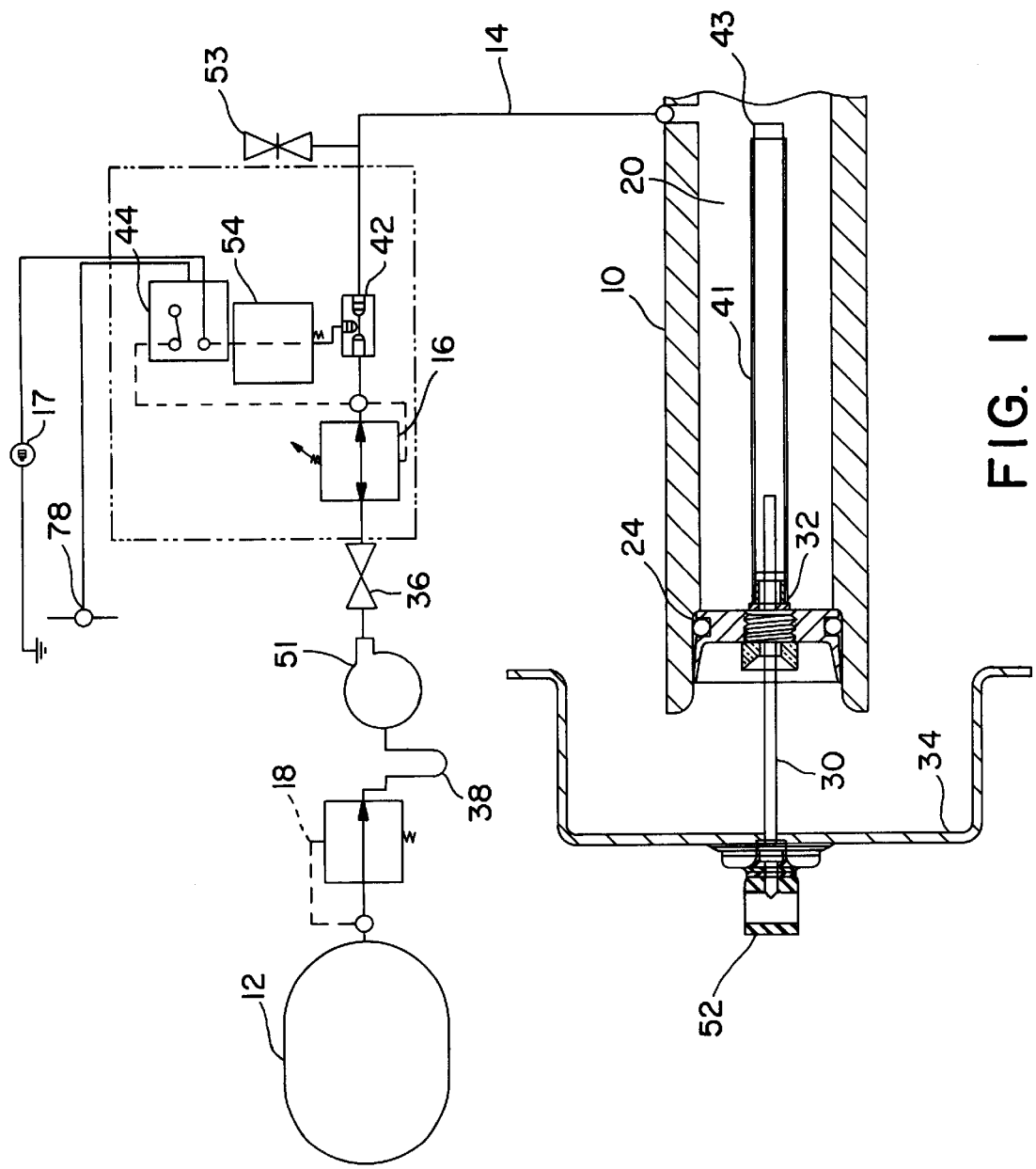
FIG. 1 is a fragmentary schematic diagram of an air inflation system of the present invention, including a booster pump.

Referring now to the drawings, and particularly to FIG. 1, the reference numeral 10 generally indicates one axle of a vehicle such as a truck-trailer having a plurality of axles with wheels having one or more pneumatic tires (not shown) at each end of the axle, an air supply on the vehicle such as a truck compressor that stores air in a reservoir tank 12, an air connection 14 between the air supply reservoir 12 and the tires for supplying air thereto, a pressure control switch, such as a pressure regulator 16, for controlling the pressure in the air connection 14, and a warning indicator 17, such as a warning light. A low pressure protection valve 18 may also be used which only moves to the open position when a predetermined value of pressure in the air supply 12, such as 80 psi, is available.

The present ATIS has a rotary connection, similar to that disclosed in U.S. patent application Ser. No. 09/309,140 filed May 10, 1999, entitled "Press Plug Support for Tire Inflation System", which is hereby incorporated herein by reference. The air connection 14 supplies air and pressurizes the inside 20 of the axle 10 with air for supplying air to the pneumatic tires at each end of the axle 10. An air sealing barrier 24, such as a press plug, is sealingly connected in each end of the axle 10 and supports a conduit 41, and an air filter 43, for receiving the air from the interior 20 of the axle 10. A rotary tube 30 extends into the conduit 41 through a rotary seal 32 for receiving air and extends through a hub cap 34 and to a stem connector 52 for connection to hoses (not shown) for conducting the air to one or more pneumatic tires.

The sensor, as more fully described in U.S. Pat. No. 5,767,398 which is herewith incorporated by reference, includes an air flow restriction 42, such as a venturi, positioned in the air connection 14. An air actuated differential pressure switch 44 has one output connected to the air connection 14 upstream of the flow restriction 42 and a second input connected to the venturi 42. The pressure switch 44 is connected to and actuates the warning indicator 17 from the electrical power source 78. The ATIS may also include a conventional shut-off valve 36 and filter valve 38.

The above general description of the ATIS is generally disclosed in the foregoing patents and applications. However, where the air pressure in the reservoir 12 is restricted and limited, such as by law, there is not a sufficient air pressure to properly inflate certain type of pneumatic tires.

The present invention incorporates a booster pump 51 connected between the air supply 12 and the rotary connection 30 in the air connection 14 for increasing the air pressure from the air supply 12. The present invention also includes a pressure relief valve 53 for protecting the system in the event of excess pressures. And also, as will be more fully described hereinafter, the booster pump 51 creates pressure surges when it operates and cycles to induce large differential pressures into the system thus actuating the warning light 17 with each compression stroke of the pump 51. Therefore, a surge protection valve 54 is provided to dampen the pressure surge that the pump 51 produces when it operates. The surge protection valve 54 is preferably placed between the venturi 42 and the pressure differential switch 44. One suitable pressure surge valve that is satisfactory, is one sold by Operating & Maintenance Specialties, Inc. under the trademark "Ray Snubber".

Figure 2:
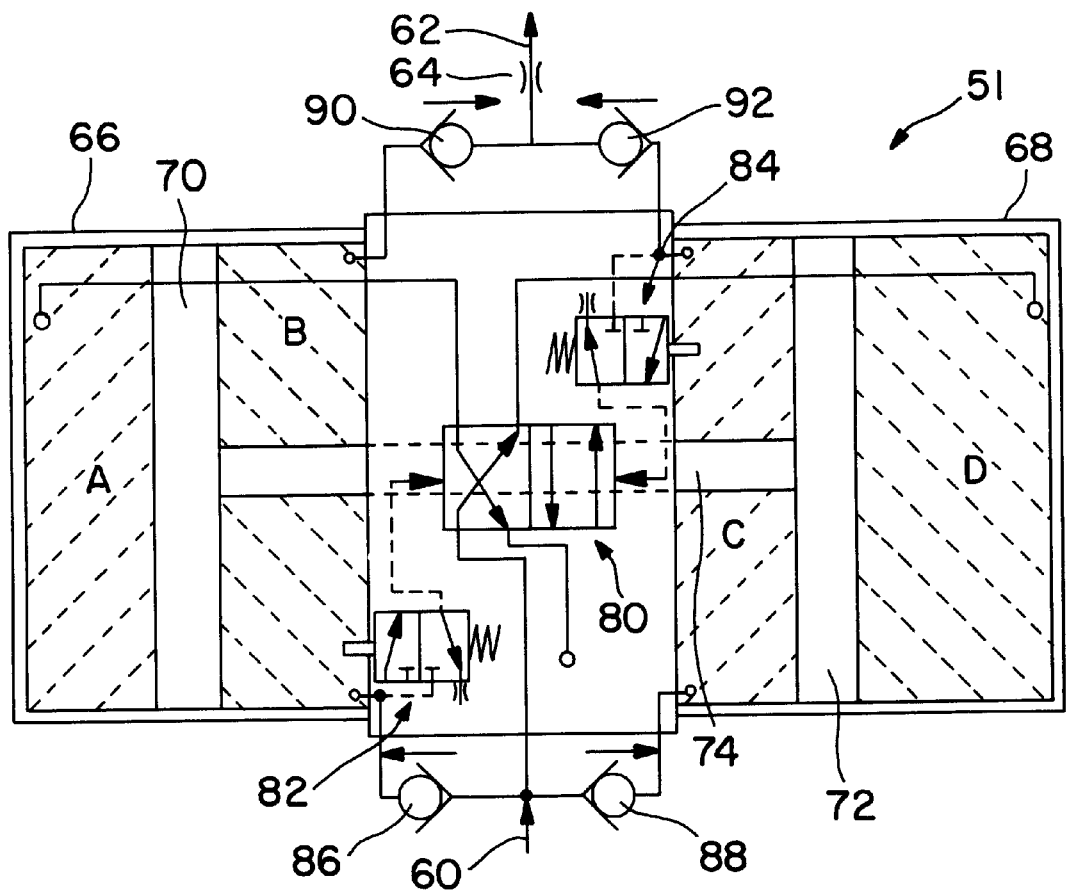
FIG. 2 is an enlarged schematic elevational view, in cross section, of the booster pump shown in FIG. 1.

Referring now to FIG. 2, the structure and operation of the booster pump 51 is best seen. The booster pump includes an inlet 60 which is connected to the air supply 12, and an outlet 62 through a restriction, such as an orifice 64, which is connected in the air connection 14 to the rotary connection 30 and the tires. The pump 51 receives the air from the air supply 12 and is driven by the compressed air in the air supply 12 to cycle and pump the air supply to a higher output pressure.

The booster pump 51 includes a first cylinder 66 and a second cylinder 68 each having a piston movable therein. Thus, piston 70 is movable in cylinder 66 and piston 72 is movable in cylinder 68. Pistons 70 and 72 are connected together by a piston rod 74. Preferably, the pistons 70 and 72 are equally sized.

The first cylinder 66 includes chambers A and B on opposite sides of the piston 70. The second cylinder 68 includes chambers C and D on opposite sides of the piston 72. High pressure is generated in chamber C by simultaneously pressuring chambers B and D and exhausting chamber A. On the next cycle, high pressure is generated in chamber B by simultaneously pressuring chambers A and C with input pressure and exhausting chamber D. Spool valve 80 controls the pressuring and exhausting chambers A and D. Cycling is achieved through the use of two spring-biased pilot valves 82 and 84. The pilot valves 82 and 84 alternately pilot and vent the spool valve 80 when one of the pistons 70 and 72 makes contact with one of the pilot valves 82 and 84, respectively.

Check valves are used to control the flow of air into and out of the booster pump 51. Thus, input check valves 86 and 88 are connected between the input 60 and chambers B and C, respectively. Output check valves 90 and 92 are connected between the output 62 and chambers B and C, respectively.

In the position shown in FIG. 2, air pressure from the air supply reservoir 12 is supplied to the inlet 60 and is initially supplied through the check valves 86 and 88 to the chambers B and C. With pilot valve 82 being previously actuated by piston 70, spool valve 80 is in the position shown by being connected to the input 60 to pressurize chamber D and by connecting chamber A to the exhaust. Spool valve 80 is in this position because the pistons 70 and 72 have previously been in the right-hand position causing pilot valve 84 to be in position to exhaust pressure from the right side of spool valve 80 while pilot valve 82 had previously been actuated by the piston 70 to admit air to the left side of the spool valve 80 for moving it to the position as shown. Therefore, pressure continues to be supplied to chambers B and D moving the piston 70 and 72 to the left in the cylinder 66 and 68, respectively. This causes the pressure in chamber C to build to higher levels closing check valve 88, opening check valve 92 and closing check valve 90 to transmit the higher pressure air from chamber C to the outlet 62.

Therefore, it is noted that the pressure in chamber C can be intensified to a pressure greater than that in the inlet 60 because of the inlet pressure working in both chambers B and D against one side of the pistons 70 and 72.

The cycle will end when the piston 72 contacts the pilot piston 84 causing it to move against its spring and supply air on the right-hand side of the spool valve 80 moving the spool 80 to the left thereby exhausting chamber D and simultaneously pressuring chambers A and C with inlet pressure. Therefore, on the reverse cycle high pressure is now generated in chamber B. Cycling is continued through the use of the two spring-biased pilot valves 82 and 84 shifting the spool valves 80 which control pressuring and exhausting chambers A and D.

When the maximum desired outlet pressure is achieved, the booster 51 will stall (no piston movement). In other words, the external forces on the pistons 70 and 72 have equalized. If the pressure at the outlet 62 drops below the maximum outlet pressure, the pistons 70 and 72 will begin to move, recycles, and build pressure back to the maximum outlet pressure. Therefore, the booster pump 51 is driven by the incoming compressed air supply from the reservoir 12 enabling the pump 51 to cycle and to pump the supply to a higher output pressure to supply the necessary pressure required for the pneumatic tires being used.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. In an air inflation system for a vehicle having at least one axle with at least one wheel having a pneumatic tire at each end of the axle, said vehicle having an air supply, an air connection including a rotary connection between the air supply and the tires, the improvement of means for increasing the air pressure from the air supply to the tires comprising, an air booster pump having an inlet and an outlet, said inlet connected to the air supply and said outlet connected to the rotary connection and the tires, said pump increasing the air pressure from the air supply.

2. The apparatus of claim 1 wherein the booster pump includes first and second cylinders, each cylinder having a piston movable therein, and said piston being connected together.

3. The apparatus of claim 2 wherein the pistons are equally sized.

4. The apparatus of claim 2 wherein the first cylinder includes chambers A and B on opposite sides of the piston therein, and the second cylinder includes chambers C and D on opposite sides of the piston therein.

5. The apparatus of claim 4 including a spool valve which controls pressuring and exhausting chambers A and D and first and second pilot valves that control the spool valve.

6. The apparatus of claim 5 including first and second check valves connected between the inlet and chambers B and C, respectively, and third and fourth check valves connected between chambers B and C, respectively, and the outlet.

7. The apparatus of claim 6 wherein the spool valve is connected to the inlet and to an exhaust.

8. In an air inflation system for a vehicle having at least one axle with at least one wheel having a pneumatic tire at each end of the axle, said vehicle having an air supply, an air connection between the air supply and the tires including an air passageway inside the axle and a rotary air connection in communication with the passageway, a pressure control valve controlling the pressure in the air connection, a sensor connected to the air connection for detecting an air leak in a tire, the improvement of means for increasing the air pressure from the air supply to the tires comprising, an air booster pump having an inlet and an outlet, said inlet connected to the air supply and said outlet connected to the air connection to the tires, said pump increasing the air pressure from the air supply.

9. The apparatus of claim 8 including a surge protection valve connected to the outlet of the booster pump and to the sensor for dampening any pressure surge produced by the pump.

10. The apparatus of claim 9 wherein the booster pump includes first and second cylinders, each cylinder having a piston movable therein, and said piston being connected together.

11. The apparatus of claim 10 wherein the pistons are equally sized.

12. The apparatus of claim 9 wherein the first cylinder includes chambers A and B on opposite sides of the piston therein, and the second cylinder includes chambers C and D on opposite sides of the piston therein.

13. The apparatus of claim 12 including a spool valve which controls pressuring and exhausting chambers A and D and first and second pilot valves that control the spool valve.

14. The apparatus of claim 13 including first and second check valves connected between the inlet and chambers B and C, respectively, and third and fourth check valves connected between chambers B and C, respectively, and the outlet.

15. The apparatus of claim 14 including wherein the spool valve is connected to the inlet and to the exhaust.

16. The apparatus of claim 15 including a pressure relief valve connected to the outlet of the booster pump.

* * * * *